United States Patent
Datta et al.

(10) Patent No.: US 10,164,822 B2
(45) Date of Patent: *Dec. 25, 2018

(54) FLATNET FAILOVER CONTROL

(71) Applicant: FatPipe, Inc., Salt Lake City, UT (US)

(72) Inventors: Sanchaita Datta, Salt Lake City, UT (US); Bhaskar Ragula, Salt Lake City, UT (US); Sankhadip Sengupta, Salt Lake City, UT (US)

(73) Assignee: FatPipe, Inc., Salt Lake City, UT (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/216,499

(22) Filed: Jul. 21, 2016

(65) Prior Publication Data

US 2016/0330070 A1 Nov. 10, 2016

Related U.S. Application Data

(63) Continuation of application No. PCT/US2014/041229, filed on Jun. 6, 2014, which is
(Continued)

(51) Int. Cl.
*H04W 4/00* (2018.01)
*H04B 7/00* (2006.01)
(Continued)

(52) U.S. Cl.
CPC ...... *H04L 41/0654* (2013.01); *H04L 41/0659* (2013.01); *H04L 47/125* (2013.01);
(Continued)

(58) Field of Classification Search
None
See application file for complete search history.

(56) References Cited

U.S. PATENT DOCUMENTS 6,189,042 B1 2/2001 Keller-Tuberg
7,359,394 B2 4/2008 Banks et al.
(Continued)

OTHER PUBLICATIONS

"GNAT Box System Software version 3.5.1: Index", retrieved from <<http://www.ravelledsleeve.org/portfolio/RoboHelp/SystemSoftware/index_1.htm>>, 1 page, 2004.
(Continued)

*Primary Examiner* — Kenny S Lin
(74) *Attorney, Agent, or Firm* — Ogilvie Law Firm

(57) ABSTRACT

Failover controllers help maintain user-perceived continuous connectivity for users of a geographically dispersed flat network when part of that network becomes unavailable, even though flat network packets are not WAN-routable. One such controller has local and remote flat network ports, at least one WAN port, and failover capability to WAN(s) utilizing encapsulation when the flat network is partially or fully unavailable. The failover procedure uses a packet origin table built automatically from incoming packets and from double-tunneled ARP requests. A monitor indicates whether the flat network is fully available (up) or not fully available (down). Controller software updates the packet origin table, and directs packets between ports depending on flatnet status, the packet origin table's content, and any packet handling enhancements such as load balancing, affinity enforcement, quality of service maintenance, packet traffic shaping, packet policy application, firewall operation, reverse firewall operation, encryption/decryption, and/or compression/decompression.

20 Claims, 6 Drawing Sheets

Related U.S. Application Data a continuation of application No. 14/172,708, filed on Feb. 4, 2014, now Pat. No. 8,780,811.

(51) Int. Cl.
```
H04L 12/24      (2006.01)
H04L 12/803     (2013.01)
H04L 29/12      (2006.01)
H04L 29/06      (2006.01)
```

(52) U.S. Cl.
CPC ........ *H04L 61/103* (2013.01); *H04L 61/2592* (2013.01); *H04L 63/0428* (2013.01)

(56) References Cited

U.S. PATENT DOCUMENTS

| | | | |
|---|---|---|---|
| 7,490,351 | B1 | 2/2009 | Caves et al. |
| 8,516,150 | B2 | 8/2013 | Darr et al. |
| 8,780,811 | B1 * | 7/2014 | Datta .......... H04L 41/0659 370/310.2 |
| 2004/0010583 | A1 | 1/2004 | Yu et al. |
| 2007/0038743 | A1 | 2/2007 | Hellhake et al. |
| 2011/0282988 | A1 | 11/2011 | Wang et al. |
| 2012/0014386 | A1 | 1/2012 | Xiong et al. |

OTHER PUBLICATIONS

"Bridged Protocols", retrieved from <<http://www.ravelledsleeve.org/portfolio/RoboHelp/SystemSoftware/bridged_protocols.htm>>, 1 page, 2004.

"Pass Through", retrieved from <<http://www.ravelledsleeve.org/portfolio/RoboHelp/SystemSoftware/passthru.htm>>, 1 page, 2004.

"WAN Failover Scenarios Using Digi Wireless WAN Routers", retrieved from <<http://www.digi.com/pdf/appguide_cellular_wan_backup.pdf>>, 8 pages, Feb. 2008.

"Request for Comments: 4903", Network Working Group, available through <<http://www.ietf.org>>, 16 pages, Jun. 2007.

"Transparent Bridging", retrieved from <<http://docwiki.cisco.com/wiki/Transparent_Bridging>>, 8 pages, 1992-2012.

"Bridging (networking)", retrieved from <<http://en.wikipedia.org/wiki/Network_bridge>>, 1 page, Oct. 26, 2013.

"Router (computing)", retrieved from <<http://en.wikipedia.org/wiki/Router_(computing)>>, 4 pages, Nov. 14, 2013.

"Virtual LAN", retrieved from <<http://en.wikipedia.org/wiki/Vlan>>, 8 pages, Nov. 15, 2013.

"Subnetwork", retrieved from <<http://en.wikipedia.org/wiki/Subnetwork>>, 9 pages, Nov. 11, 2013.

"Classless Inter-Domain Routing", retrieved from <<http://en.wikipedia.org/wiki/CIDR_notation>>, 10 pages, Nov. 12, 2013.

"Understanding TCP/IP addressing and subnetting basics", retrieved from <<http://support.microsoft.com/kb/164015>>, 4 pages, Sep. 23, 2011.

"Request for Comments: 925", Network Working Group, available through <<http://www.ietf.org>>, 16 pages, Oct. 1984.

Request for Comments: 1027 Network Working Group, available through <<http://www.ietf.org>>, 8 pages, Oct. 1987.

"Re: [armd] What is the proper definition for Broadcast Domain? which is used in draft-ietfarmd-problem-statement-00", retrieved from <<http://www.ietf.org/mail-archive/web/armd/current/msg00340.html>>, 4 pages, Nov. 9, 2011.

"Ip 0.0.0.0 and arp request question", retrieved from <<https://csc.cdf.toronto.edu/mybb/showthread.php?pid=4084>>, 4 pages, Oct. 20, 2012.

"Re: [OpenI2tp-users] [Bridge] challenge of year: connect to LAN using wireless-ap over bridge + unmanaged I2tpv3 tunnel + bridge? it's possible?", retrieved from <<http://www.mail-archive.com/openI2tp-users@lists.sourceforge.net/msg00039.html>>, 8 pages, Aug. 25, 2013.

"Inside host not pinging outside host in transparent mode", retrieved from <<https://supportforums.cisco.com/thread/55959>>, 5 pages, Jul. 4, 2005.

"How to Configure Layer 3 Static Routes & VLAN's on HP v1910 24G", retrieved from <<http://vmfocus.com/2012/09/26/how-to-configure-layer-3-static-routes-vlans-on-hp-v1910-24g/>>, 25 pages, Sep. 26, 2012.

"How to Configure InterVLAN Routing on Layer 3 Switches", retrieved from <<http://www.cisco.com/en/US/tech/tk389/tk815/technologies_configuration_example09186a008019e74e.shtml>>, 6 pages, Apr. 2, 2012.

"Need Help with Poorly Designed Network Splitting", retrieved from <<http://www.experts-exchange.com/Networking/Network_Management/Network_Design_and_Methodology/Q_26851064.html>>, 6 pages, Feb. 27, 2011.

"Internet", retrieved from <<http://en.wikipedia.org/wiki/Internet>>, 16 pages, Jan. 14, 2014.

"Flat network", retrieved from <<http://en.wikipedia.org/wiki/Flat_network>>, 2 pages, Jan. 5, 2014.

"Broadcast domain", retrieved from <<http://en.wikipedia.org/wiki/Broadcast_domain>>, 2 pages, Dec. 13, 2013.

"Data link layer", retrieved from <<http://en.wikipedia.org/wiki/Data_link_layer>>, 6 pages, Jan. 11, 2014.

"IPv4", retrieved from <<http://en.wikipedia.org/wiki/IPv4>>, 12 pages, Jan. 13, 2014.

"Internet layer", retrieved from <<http://en.wikipedia.org/wiki/Internet_layer>>, 4 pages, Jun. 23, 2013.

"MAC address", retrieved from <<http://en.wikipedia.org/wiki/MAC_address>>, 4 pages, Jan. 11, 2014.

"Neighbor Discovery Protocol", retrieved from <<http://en.wikipedia.org/wiki/Neighbor_Discovery_Protocol>>, 3 pages, Dec. 12, 2013.

"Address Resolution Protocol", retrieved from <<http://en.wikipedia.org/wiki/Address_Resolution_Protocol>>, 7 pages, Jan. 9, 2014.

"Generic Routing Encapsulation", retrieved from <<http://en.wikipedia.org/wiki/Generic_Routing_Encapsulation>>, 3 pages, Jan. 7, 2014.

"Load balancing (computing)", retrieved from <<http://en.wikipedia.org/wiki/Load_balancing_(computing)>>, 7 pages, Jan. 12, 2014.

* cited by examiner

US 10,164,822 B2

FLATNET FAILOVER CONTROL

RELATED APPLICATIONS

The present application claims priority to each of the following to the full extent permitted by applicable law, and also incorporates herein by reference the entire content of each of the following: international patent application PCT/US2014/041229 filed Jun. 6, 2014, which claims priority to U.S. patent application Ser. No. 14/172,708 filed Feb. 4, 2014, which is now U.S. Pat. No. 8,780,811.

BACKGROUND

Networks are complex, and their use is subject to a wide, inconsistent, and changing collection of technical requirements and options. For example, a given packet payload on a journey between two networked locations may be subject to multiple addressing formats, a plurality of transmission protocols, varied security options or requirements, intermittent hardware and software reliability, several particular priorities relative to other packets, and many different filtering rules.

The immense number of possible combinations of known and future networking technical options and requirements is overwhelming, even if one focuses only on features currently in use somewhere. Experienced network professionals sometimes indulge in guesswork and experimentation, because no one has yet fully mastered the enormous amount of information required to understand all networking requirements and options. At the same time, however, network professionals recognize that blindly trying different combinations will not consistently provide even a minimally functioning network architecture. And for practical purposes, simply trying different combinations of known features will almost never provide an efficient and reliable network architecture. In addition to the low probability of chancing upon a cost-effective and working combination of features, the efforts and expenses involved in setting up a network architecture are often substantial, so experimentation is severely hampered in practice.

Accordingly, effective network professionals use and depend on particular devices, systems, and processes which have been designed by experienced network innovators who have a proven track record of success.

SUMMARY

Some embodiments are directed to the technical problem of maintaining connectivity for users of a geographically dispersed flat network when part of that network becomes unavailable, even though flat network packets are not WAN-routable. Some embodiments provide a failover controller which remedies technical problems such as the lack of IP addressing in normal flat network operation, by extending network appliance functionality with a packet handler, a packet origin table, double encapsulation of certain packets, and other features described herein.

One embodiment includes a controller with two flat network ports, at least one WAN port, and failover capability to WAN(s) when a flat network is partially or fully unavailable. The failover procedure uses a packet origin table which is built automatically by watching packets and by using double-tunneled ARP request when the flat network is down and the table lacks a desired physical address. A flatnet monitor indicates whether the flat network is fully available (e.g., flatnet-connection-up indication) or not fully available (e.g., flatnet-connection-down indication), based for example on whether or not packets were recently successfully transmitted between the remote portion of the flatnet and the controller. The controller software (multithreaded in some embodiments) updates the packet origin table, and directs packets between ports depending on the flatnet status indications and the packet handling enhancements being done by a packet handler. The packet handler updates the packet origin table to identify hosts (by IP address and/or physical address) from addressing in received packets, and associates a packet's source host with whichever port the packet arrived on. This automatically builds a representation of hosts' respective locations in the network architecture relative to the controller's position.

Regardless of flatnet status, the packet handler ignores a packet when the packet is traveling locally, that is from a host in the local portion of the flatnet to another host in that same local portion of the flatnet. Otherwise, when the flatnet is up, the packet handler passes the packet through toward the other flatnet port, namely, from the local port to the remote port or vice versa. This may be a simple bridge pass-through, or packet handling enhancement(s) can be applied while passing the packet through to the other flatnet port.

When the flatnet is down, the packet handler IP encapsulates local flatnet packets and transmits them over a WAN port. The packet handler decapsulates remote flatnet packets received on a WAN port, and transmits the retrieved packets to the local flatnet portion. To achieve these various results, the packet handler pulls the destination host's physical address from the packet origin table, if it is there, or uses ARP to obtain the physical address if it is not (and then updates the packet origin table for next time). In some embodiments, ARP packets are double-tunneled through to a remote controller as needed, to obtain a remote host's physical address.

In some embodiments, packet handling enhancements include load balancing, affinity enforcement, quality of service maintenance, packet traffic shaping, packet policy application, firewall operation, reverse firewall operation, encryption/decryption, and/or compression/decompression. In some embodiments, some or all of these enhancements are applied regardless of the flatnet's current status, while in other embodiments the enhancements are used only when the flatnet is at least partially unavailable.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Some Abbreviations

Figure 1:
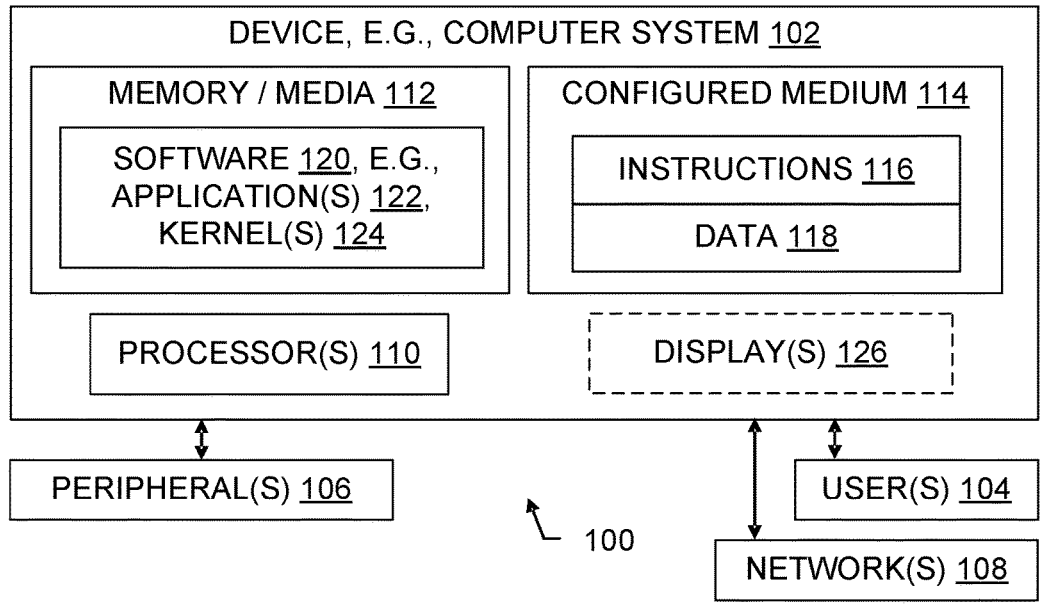
FIG. 1 is a block diagram illustrating a computer system having at least one processor and at least one memory which interact with one another under the control of software, also illustrating other items in an operating environment which may be present on multiple network nodes, and also illustrating configured storage medium (as opposed to mere signal per se) aspects of some embodiments.

"ALU" means Arithmetic and Logic Unit.
"ARP" means Address Resolution Protocol.
"CD" means Compact Disc.
"CPU" means Central Processing Unit.
"DSL" means Digital Subscriber Line.
"DVD" means Digital Versatile Disc (formerly Digital Video Disc).
"FPU" means Floating Point processing Unit.
"GPU" means Graphical Processing Unit.
"GRE" means Generic Routing Encapsulation.
"I/O" means Input/Output.
"ICMP" means Internet Control Message Protocol.
"IEEE" means Institute of Electrical and Electronics Engineers.
"IP" means Internet Protocol.
"IPv4" means Internet Protocol version 4.
"IPv6" means Internet Protocol version 6.
"LAN" means Local Area Network.
"NDP" means Neighbor Discovery Protocol.
"OSI" means Open Systems Interconnection.
"RAM" means Random Access Memory.
"ROM" means Read-Only Memory.
"TCP/IP" means Transmission Control Protocol/Internet Protocol.
"UDP" means User Datagram Protocol.
"USPTO" means United States Patent and Trademark Office.
"VLAN" means Virtual Local Area Network.
"WAN" means Wide Area Network.
Some other abbreviations are also defined below.

Overview

The most widely used network in the world is the Internet, which is a network of networks that serves several billion users worldwide. The core data transfer protocols used in the Internet are IPv4 and IPv6, which are mainly used in the internet layer or network layer of a standard TCP/IP or OSI protocol suite; the core name spaces used are the Internet Protocol address space and the Domain Name System.

However, some networks do not use the Internet Protocol address space. In particular, a "flat network" (also sometimes called a "flatnet") is a network which in familiar implementations does not rely on the Internet Protocol address space because lower level addresses are used instead. Hosts of a given subnet can be part of a flat network, for example. The lower level addresses are called "physical addresses", and are also sometimes known as "data link layer addresses", "link layer addresses", "hardware addresses", or "network interface addresses". A "MAC address" (also sometimes called a "Media Access Layer address", "burned-in address", "Extended Unique Identifier address", or "Ethernet hardware address") is an example of a physical address.

Although flat networks were originally intended for use in homes or small businesses where easy scaling of network size, strong security, link redundancy, and network separation were not high priorities, over time flat networks have become part of the network architectures used in many mid-sized to large-sized enterprises, agencies, and institutions. Network engineers and administrators in these entities face significant challenges as a result of the growth in flat networks.

For example, although flat networks were originally used in close proximity to all their host machines, e.g., within a single building, some flat networks are now geographically dispersed. Some flat networks lie partially in different buildings and sometimes a single flat network spans different postal codes. Indeed, in coming years one may see flat networks that stretch between two or more cities. Network size matters, because the difficulty of diagnosing a problem in a flat network often grows along with the size of the flat network.

In hindsight, one might consider performing a "failover" by sending flat network traffic over a WAN link while the flat network is down for diagnosis, repair, an upgrade installation, or some other reason. But how would this actually be done? Flat networks do not utilize IP addresses, but WAN routing requires IP addresses. Although host machines on a flat network may have IP addresses associated with them, it is not immediately clear how to take advantage of those IP addresses when part of the flat network is unavailable.

Unlike traditional subnets in which the hosts within a specified IP address range can be routed together, the IP addresses for flat network hosts may well be spread across a large area in a haphazard manner. For instance, one end of a flat network might have hosts with IP addresses 10.0.0.4, 10.0.0.8, and 10.0.0.10 while the other end of the flat network (in another building, another zip code, or even another municipality) has hosts with IP addresses 10.0.0.2, 10.0.0.3, 10.0.0.5, 10.0.0.6, and 10.0.0.7. So even if a subnet were defined, the subnet definition would not indicate where to actually route a given packet based on whether the packet's destination address is inside the subnet's address range.

The present disclosure describes innovative failover controllers which provide redundancy so that flat network packets can be routed over a wide area network (WAN) when the flat network is not working or otherwise unavailable. In most cases, these failover controllers impose very little overhead on the normal operation of a flat network. In some embodiments, the failover controller handles haphazard IP address assignments, as well as more orderly IP address layouts.

In some, the failover controller automatically learns the relative locations of flat network hosts, which helps avoid burdening the network's administrator and speeds packet handling when the flat network fails. Some embodiments of the controller provide load balancing over multiple WAN lines, firewall or reverse firewall functionality, and other packet handling enhancements. Some failover controllers work in pairs with one another to provide encryption/ decryption and/or compression/decompression, as well as providing an innovative packet encapsulation/decapsulation that lets the controllers utilize one or more WANs when the flat network is unavailable. Some failover controllers utilize innovative double encapsulation to extend ARP functionality for more effective packet handling, and some use NDP.

Some embodiments described herein may be viewed in a broader context. For instance, concepts such as connection status, encapsulation, flat networks, physical addresses, and ports may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving connection status, encapsulation, flat networks, physical addresses, and/or ports are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as intermittent connectivity failures in a flat network. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein build and use a packet origin table. Third, technical effects provided by some embodiments include transparent failover from a faulty flat network connection to one or more WAN connections. Fourth, some embodiments include technical adaptations such as GRE-encapsulated flat network packets, double-encapsulated ARP packets, or flat network packets subjected to layer 3 routing. Fifth, technical advantages of some embodiments include increased reliability of communications submitted to a flat network, simplified development of custom architectures that include a flat network, and faster processing to achieve transparent failover to a WAN from a flat network.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "host" is any computer or other device which is connected to a network to receive and/or transmit data through the network, and which has a physical address.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Any reference to an industry standard in a claim refers to the broadest application of that standard available under applicable law of the jurisdiction in question. In particular, to the extent required by United States law reference to an industry standard is directed at the pertinent portion of the standard as it existed at the original time of filing the present disclosure with the USPTO.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as addressing, applying, ascertaining, associating, balancing, compressing, connecting, containing, decapsulating, decompressing, decrypting, detecting, determining, discarding, encapsulating, encrypting, enforcing, failing over, finding, filtering, identifying, ignoring, maintaining, monitoring, obtaining, operating, performing, placing, processing, providing, receiving, reading, residing, sending, separating, shaping, submitting, transmitting, traveling, updating, using, utilizing, writing (and addresses, addressed, applies, applied, ascertains, ascertained, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102, such as a host on a network. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, as a failover controller, and/or in other ways.

Human users 104 may interact directly or indirectly with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

One of skill will appreciate that the foregoing aspects and other aspects presented herein under "Operating Environments" may also form part of a given embodiment. This document's headings are not intended to provide a strict classification of features into embodiment and non-embodiment feature classes. In particular, some network architectures that may also serve as operating environments for one or more failover controller devices are further illustrated in FIGS. 6 through 8, which are discussed below after considering a failover controller and its operations in detail in conjunction with FIGS. 2-5 and 9.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, in the United States neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as or with software instructions executed by one or more processors in a computing device (e.g., general purpose computer, cell phone, gaming console, or failover controller), such description is not meant to exhaust all possible embodiments. One of skill will understand that the same or similar functionality can also often be implemented, in whole or in part, directly in hardware logic, to provide the same or similar technical effects. Alternatively, or in addition to software aspects of a given implementation, the technical functionality described herein can be performed, at least in part, by one or more hardware logic components, and vice versa. For example, and without excluding other implementations, an embodiment may include supporting hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more pieces of software 120 such as applications 122 and kernels 124 have code reside in the system 102 media 112 and are executable using the system 102 processor(s) 110. The software 120 and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s) 126, and battery(ies), an operating environment may also include other hardware, such as buses, power supplies, wired and wireless network interface cards, and accelerators, for instance, whose respective operations are described herein to the extent not already apparent to one of skill.

One or more items are shown in outline form in the Figures to emphasize that they are not necessarily part of the illustrated operating environment, but may interoperate with items in the operating environment as discussed herein. It does not follow that items not in outline form are necessarily required, in any Figure or any embodiment. Also, FIG. 1 is provided for convenience, in the sense that inclusion of an item in FIG. 1 does not imply that either the item, or the described use of the item, was known prior to the current innovations.

Systems

Figure 2:
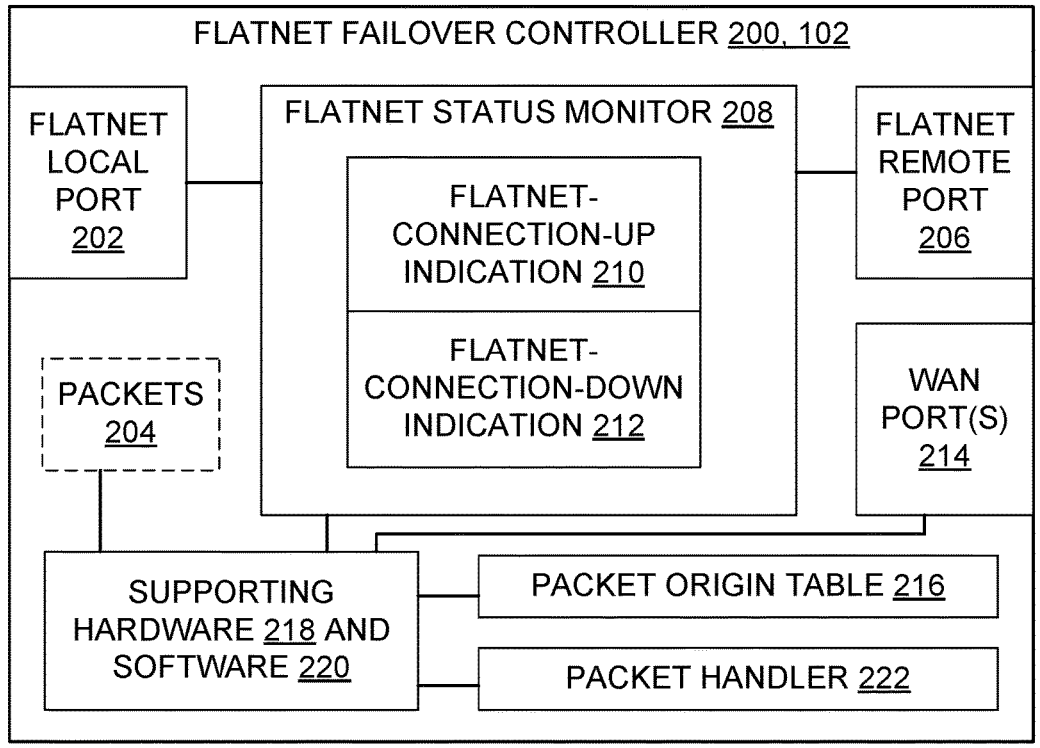
FIG. 2 is a block diagram illustrating a flatnet failover controller according to some embodiments.

FIG. 2 illustrates aspects of a failover controller architecture which is suitable for use with some embodiments. Controllers are sometimes referred to as appliances, devices, systems, boxes, or units. Note that although such controllers 200 will perhaps be used most often when a network 108 fails entirely to provide reliable connectivity, the term "failover" as used herein encompasses partial or complete network unavailability for whatever reason, be it actual component failure, capacity overload, administrative action to permit diagnosis or an upgrade, or some other cause. In particular, "failover" of a flat network includes situations in which (a) the flat network is completely down, (b) the flat network is running unreliably, e.g., transmitting packets to their intended hosts but only in an apparently random manner over time, (c) packets are being successfully and reliably transmitted but improved performance is sought by adding one or more parallel transmission paths for at least some of the packets, or (d) an administrator manually configures network component(s) to redirect flat network packets over one or more additional network connections for whatever reason.

Some failover controller 200 embodiments provide a specialized computer system 102 with a logical processor 110 and a memory medium 112 configured by circuitry, firmware, and/or software to provide technical effects such as flat network failover to a wide area network, directed at technical problems such as the lack of IP addressing in normal flat network operation, by extending functionality with a packet handler, a packet origin table, and otherwise as described herein.

One embodiment includes a controller 200 with local and remote flat network ports, at least one WAN port, and failover to WAN when the flat network is down. The failover uses a packet origin table built automatically by watching packets and by using ARP or NDP when the flat network is down and the table lacks a desired physical address. In particular, one flatnet failover controller 200 includes a flatnet local port 202 that is connectable to a local portion of a flatnet 108 such as a LAN to transmit packets 204 between the local portion of the flatnet and the controller 200. This controller 200 also has a flatnet remote port 206 that is connectable to a remote portion of the same flatnet to transmit packets between the remote portion of the flatnet and the controller 200.

In some embodiments, a flatnet status monitor 208 provides a flatnet-connection-up indication 210 or a flatnet-connection-down indication 212 based on whether or not packets were successfully transmitted between the remote portion of the flatnet and the controller 200. As noted above, lack of successful packet transmission may be due to one or more reasons, such as a flatnet component failure, a broken transmission line, a flatnet buffer overload, or an administrator 104 action which makes the flatnet unavailable. The status monitor 208 may be implemented using one or more of the following mechanisms, for example: (a) tracking the status of periodic efforts to ping a remote controller or another remote device over the flatnet remote port 206, (b) noting that packets have recently (e.g., within a specified number of seconds under ten or milliseconds under 5000) been received at the controller port 206, (c) noting whether a particular administrator-controlled flag is set in memory, or (d) noting that the packet latency, throughput, or another traffic measure has exceeded a predetermined acceptability threshold.

In some embodiments, the controller 200 includes one WAN port 214, and in some it includes more than one WAN port 214. It is contemplated that commercial embodiments having one, two, or three WAN ports 214 will be the most common, for example. The WAN port(s) may be connected to their wide area network(s) 108 by fiber, DS3 (Digital Signal level 3, metro Ethernet, DS1 (Digital Signal level 1), MPLS (MultiProtocol Label Switching), IPSec (Internet Protocol Security) and/or by other kinds of links.

In some embodiments, the controller 200 includes a packet origin table 216 residing in a computer-readable memory 112 of the controller. The memory 112 is part of supporting hardware 218 in the controller 200. Other supporting hardware may include, for example: an interface card for each port 202, 206, 214; a display 126; busses connecting functional modules shown in the Figures; hardware implementation of those modules or portions thereof; and one or more processors 110. The processor(s) 110 execute software 220 to update the packet origin table 216, and software 220 to direct packets 204 between ports 202, 206, 214 depending on the status indications 210/212 and the operational needs of a packet handler 222, such as which packet handling enhancements are operating.

In some embodiments, the packet handler 222 is operable with at least one digital processor 110 of the controller as follows on at least one packet 204 received on at least one of the ports 202, 206, 214.

In these embodiments, when the flatnet status monitor 208 provides a flatnet-connection-up indication 210 to the packet handler and the packet was received on one of the flatnet ports 202, 206, then a packet handler table updater 320 updates the packet origin table 216 so it has an entry 900 containing an identifier 902 (IP address or physical address) of a source host of the packet in association with an identifier 904 of whichever port 202, 206 the packet arrived on. The packet handler 222 ignores the packet when the packet is traveling from a host in the local portion of the flatnet to another host in the local portion of the flatnet, and otherwise the packet handler 222 passes the packet through toward the other flatnet port, namely, from the local port 202 to the remote port 206 or vice versa.

In these embodiments, when the flatnet status monitor provides a flatnet-connection-down indication 212 and the packet was received on the flatnet local port 202, the packet handler 222 ignores the packet when the packet is traveling from a host in the local portion of the flatnet to another host in the local portion of the flatnet, and otherwise the packet handler 222 submits the packet for IP encapsulation and transmission over a WAN port. IP encapsulation may be performed by a different portion of the packet handler 222 than the portion that determines whether to ignore the packet. The packet may be submitted by placing it in a buffer or queue from which an encapsulation procedure or thread draws packets, for example, or by giving IP encapsulation code a pointer to the packet's current location in memory. Transmission over a WAN port 214 may be accomplished using a network interface card, socket, and/or other familiar packet transmission mechanism.

In these embodiments, when the flatnet status monitor provides a flatnet-connection-down indication 212 and the packet was received on a WAN port (as opposed to the flatnet local port 202), then the packet handler 222 operates as follows. When the packet origin table 216 contains a physical address 906 for a host identified in the packet by an IP address 908, the packet handler 222 places 420 that physical address in the packet and sends the packet toward the flatnet local port 202 to be transmitted to the local flatnet portion. Physical addresses 906 and IP addresses 908 are example of values that can be used as source host identifiers 902. When the packet origin table 216 does not contain a physical address for a host identified in the packet by an IP address then the packet handler 222 uses Address Resolution Protocol or Neighbor Discovery Protocol to obtain said physical address, and then the packet handler 222 table updater 320 updates the table 216. The packet handler 222 places that physical address in the packet, and sends the packet toward the flatnet local port 202 for transmission.

In some embodiments aspects of a controller's operating environment are noteworthy. For example, in some cases a controller 200 is connected to a flatnet, and the flatnet extends beyond single building. Specifically, some embodiments include a flatnet failover controller 200 whose flatnet local port 202 is connected to the local portion of the flatnet, and whose flatnet remote port 206 is connected to the remote portion of the same flatnet. Moreover, the local portion of the flatnet is "geographically separated" from the remote portion of the same flatnet, in that the two portions do not reside in the same building (in some cases), or geographically separated in that the two portions do not reside in the same postal code area (in some cases). In some cases, any nontrivial division of all flatnet host IP addresses by subnet results in at least one subnet which contains geographically separated hosts of the flatnet. For this purpose, a "nontrivial division of flatnet host IP addresses by subnet" means that each of the subnet(s) contains at least four addresses, regardless of whether hosts actually use all those addresses.

Figure 3:
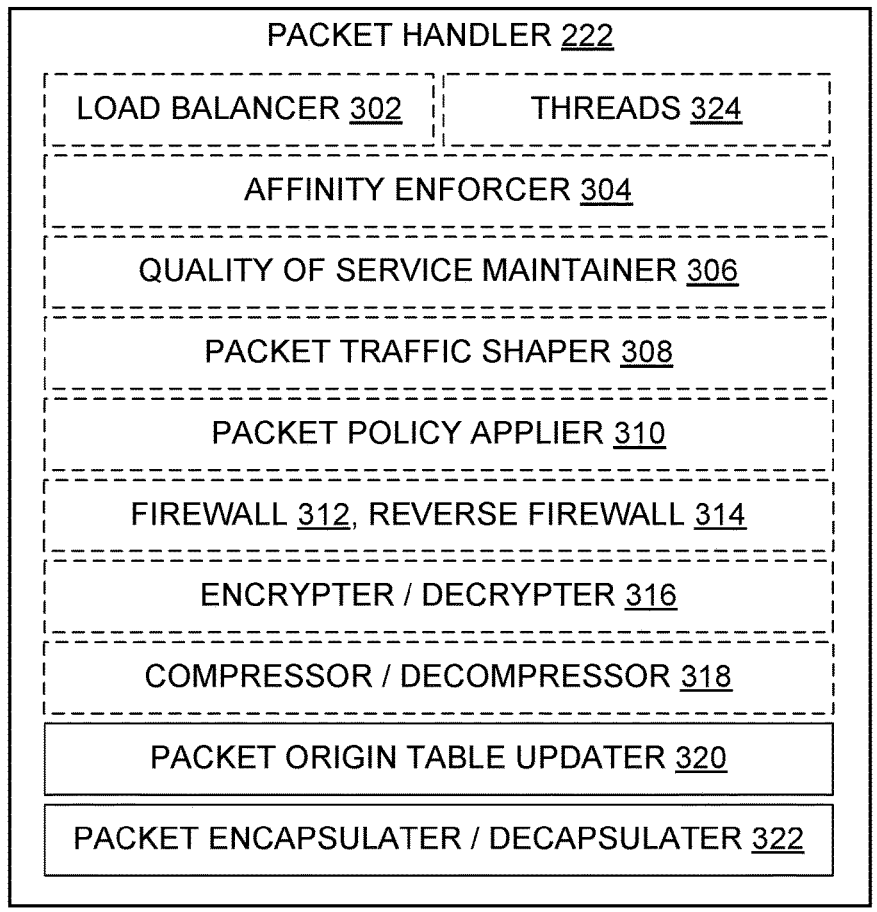
FIG. 3 is a block diagram further illustrating a flatnet failover controller according to FIG. 2, with particular attention to a packet handler of the flatnet failover controller.

In some embodiments, a controller 200 has at least two WAN ports and does load balancing between them when the flatnet is down. Specifically, as illustrated in FIGS. 2 and 3 some embodiments include a flatnet failover controller 200 having at least two WAN ports 214, and the controller's packet handler includes a load balancer 302. The load balancer 302 balances packet traffic between the at least two WAN ports at least part of the time that the flatnet status monitor 208 shows a flatnet-connection-down indication 212. Familiar load balancing mechanisms can be adapted for use in the flatnet failover controller 200, such as assigning packets or groups of packets to respective WAN ports in a round-robin manner, or in a proportional manner which is based on the relative bandwidths of the WAN connections. Factors such as the load reported in a communication 514 to the controller from a remote controller 200 or an intermediate router, the capacities of the respective WAN network interface cards, the latency of each WAN connection, and/or the up/down status of each WAN connection, are also accounted for in some load balancers 302.

In some embodiments, a controller 200 has at least one of the following: a load balancer 302, an affinity enforcer 304, a quality of service maintainer 306, a packet traffic shaper 308, a packet policy applier 310, a firewall 312, a reverse firewall 314, an encrypter/decrypter 316, or a compressor/decompressor 318. Each of these functionalities 302-318 for enhancing packet handling may be implemented using familiar mechanisms adapted for use in the flatnet failover controller 200. In some embodiments, adaptation involves placing the one or more desired packet handling enhancement functionalities 302-318 at a location in the packet handler 222 data flow at a point between a flatnet port 202 or 206 and a WAN port 214. In some, one or more functionalities 304-318 are placed in the data flow between the flatnet ports 202, 206. In some embodiments, both placement locations are used. In some, the packet handling enhancement functionalities have impact only when the flat network is down, and in some they also have impact when the flat network is up.

In some embodiments, the packet handler encrypter/decrypter 316 is operable to encrypt packets 204 submitted for transmission over a WAN port of the controller differently than packets which are submitted for transmission over a flatnet port of the controller. For example, packets going out of a WAN port 214 may be encrypted even though they would not have been encrypted if they had gone out the flatnet remote port 206. Alternately, encryption may be added prior to transmission over the WAN port to supplement encryption that is used on packets sent over the flatnet remote port. In some cases, packets going over both paths (through port 206 and through a port 214) are encrypted, but different encryption algorithms and/or different encryption key sizes are used on the different paths. Some embodiments of the encrypter/decrypter 316 incorporate tools and/or techniques for selective encryption described in U.S. Pat. No. 7,444,506, incorporated by reference herein.

Figure 9:
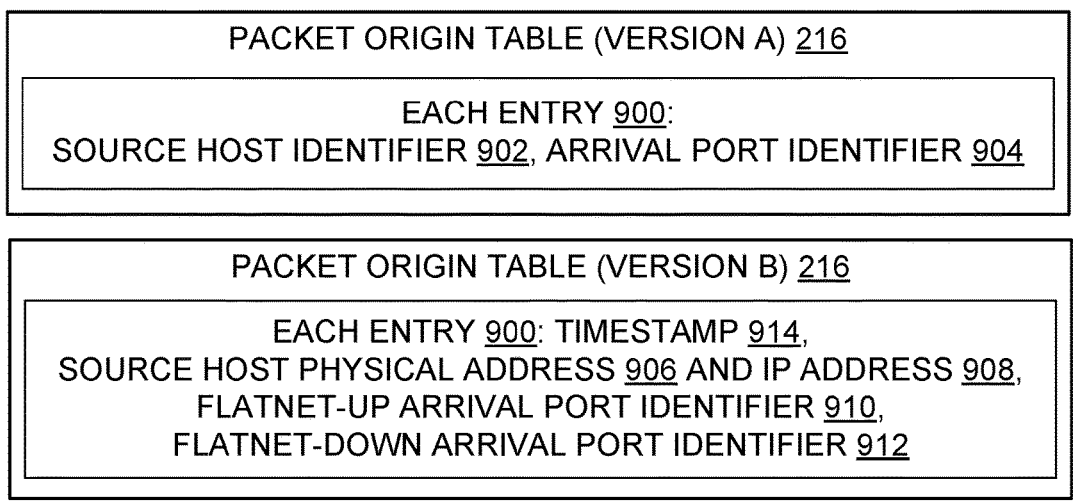
FIG. 9 is a block diagram illustrating a flatnet failover controller packet origin table according to some embodiments.

As illustrated in FIGS. 2, 3, and 9, in some embodiments the packet origin table updater 320 updates the packet origin table 216 when the flatnet is down. That is, the packet handler 222 is operable to update the packet origin table 216 with an identifier 902 of a source host of each received packet 204 and with an associated arrival port identifier 904 identifying which port 202, WAN1, WAN2, WAN3, etc. the packet was received on while flatnet-connection-down is indicated (WAN1, WAN2, WAN3 are individual WAN 214 ports). Port identifiers 904 in the table 216 may be implemented as numeric, alphanumeric, bitflag, or other digital values.

In some embodiments, the failover controller table updater 320 only builds the packet origin table 216 content while the flatnet is up. But in other embodiments, the packet handler 222 also builds the table 216 when the flatnet is down. In some embodiments, each entry 900 of the packet origin table 216 includes a MAC address field 906, 902, an IP address field 908, 902, a field 910, 904 for identifying which flatnet port the packet arrived on when the flatnet connection is up, and a field 912, 904 for identifying which port (flatnet local 202 or WAN 214 but not flatnet remote 206) the packet arrived on when the flatnet connection is down.

In some embodiments, including for instance FIG. 9 Version A identifier fields or Version B identifier fields, the table entries 900 expire after a specified time period. Expiration may be implemented, for example, by comparing the time at which the table entry 900 is read to a timestamp field 914 which specifies when the entry 900 was created or most recently modified, for example, to determine if the entry is too old to use. Expiration time periods may be kernel-specific, e.g., five minutes for a Linux® kernel or ten minutes for a Microsoft Windows® kernel (marks of their respective owners).

In some embodiments, the packet handler 222 implements a form of double-encapsulation ARP tunneling. For example, an encapsulater/decapsulator 322 of the packet handler 222 encapsulates an Address Resolution Protocol packet in a first encapsulation thereby producing an encapsulated ARP packet, and then submits the encapsulated ARP packet for IP encapsulation and transmission over a WAN port 214. More specifically, the packet handler may encapsulate an Address Resolution Protocol packet in a first encapsulation thereby producing an encapsulated ARP packet which is one of the following: a UDP packet 204, a TCP packet 204, or an ICMP packet 204.

In some embodiments, the encapsulater/decapsulator 322 of the packet handler 222 performs IP encapsulation by encapsulating a packet using at least one of the following protocols: Generic Routing Encapsulation, IP in IP.

Some controller 200 embodiments utilize multithreading. For example, some failover controllers 200 include multiple processing threads 324, and the packet handler 222 is operable to perform different packet handling functions on different threads. Suitable packet handling functions in a given embodiment may include, for example, processing packets received on a given port, processing packets sent over a given port, encrypting packet payloads, decrypting packet payloads, compressing packet payloads, and/or decompressing packet payloads.

In some embodiments, one specialized thread handles ARP tunneling, another specialized thread handles load balancing, and one or more others handle encryption, WAN optimization, compression, and/or other packet handling enhancements. In other embodiments, a given multi-function thread handles multiple packet handling enhancements, and there are a plurality of such multi-function threads in the controller 200.

Figure 6:
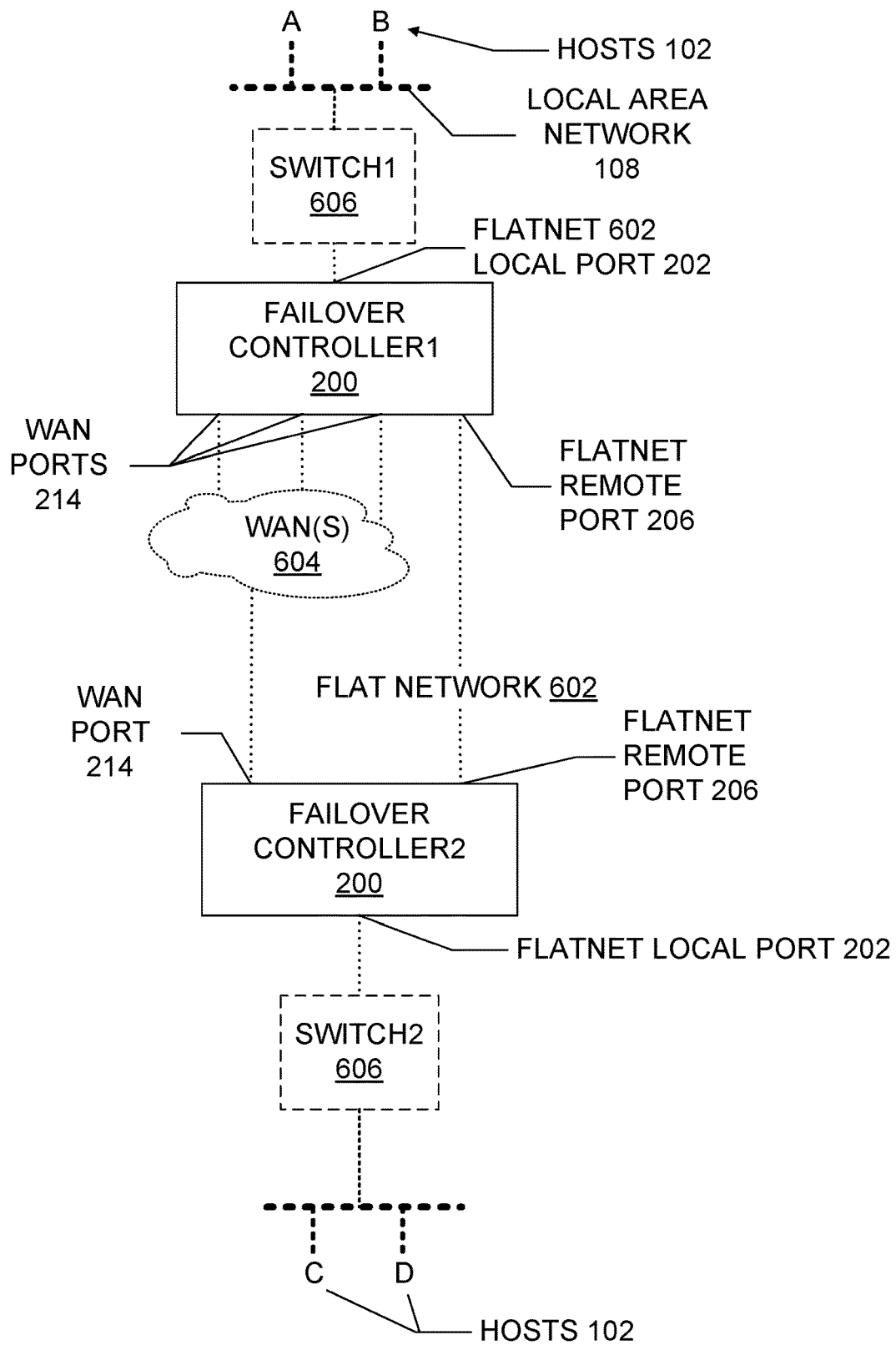
FIG. 6 is a connectivity diagram illustrating two flatnet failover controllers according to FIG. 2, arranged in a network architecture.
Figure 8:
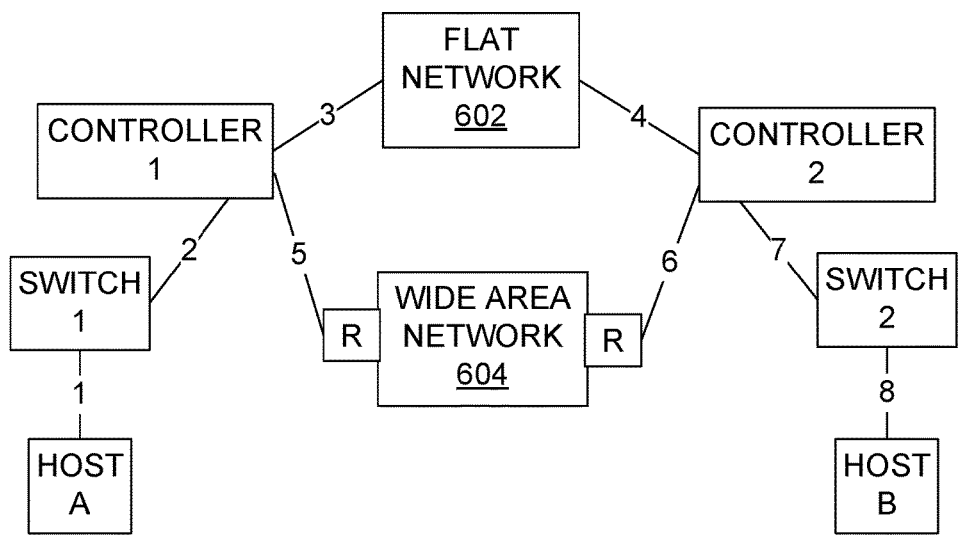
FIG. 8 is another connectivity diagram illustrating two flatnet failover controllers according to FIG. 2, arranged in another network architecture.

As illustrated in FIGS. 6 and 8, some systems 102 include two controllers located at different sites, with a portion of a flatnet 602 located at each site. In this example, each portion of the flat network 602 includes hosts 102 (designated here by alphabet letters), a LAN 108, and a switch 606. A first flatnet failover controller 200 is used in combination with a complementary second similar flatnet failover controller 200. The second flatnet failover controller flatnet local port is connected to the remote portion of the flatnet 602 (remote from the first controller's point of view), and the two flatnet remote ports are connected to one another via the flatnet 602. Suitable controllers perform complementary encapsulation and decapsulation when the flatnet 602 is down, for example. Some handle each other's double-encapsulated ARP requests through suitable decapsulation followed by local ARP requests, followed by recapsulation to report back the ARP results. In some embodiments, communicating controllers 200 also perform complementary encryption and decryption and/or perform complementary compression and decompression for packets traveling between them over a WAN 604. The different sites may be relatively close, or they may be in separate buildings, or even in separate postal codes, for example.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Processes

Figure 4:
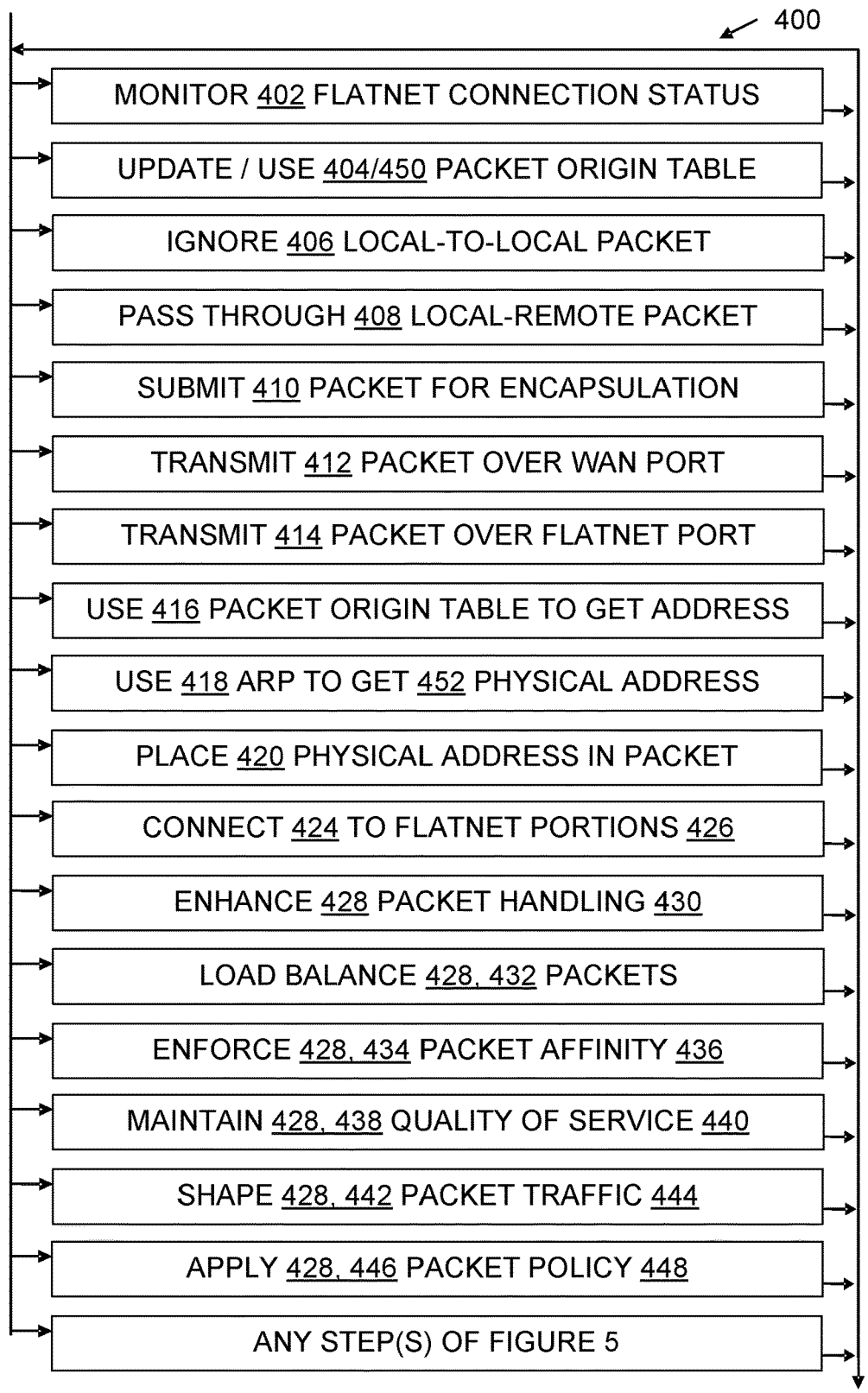
FIGS. 4 and 5 are connected flow charts illustrating steps of some process and configured storage medium aspects of some embodiments.
Figure 5:
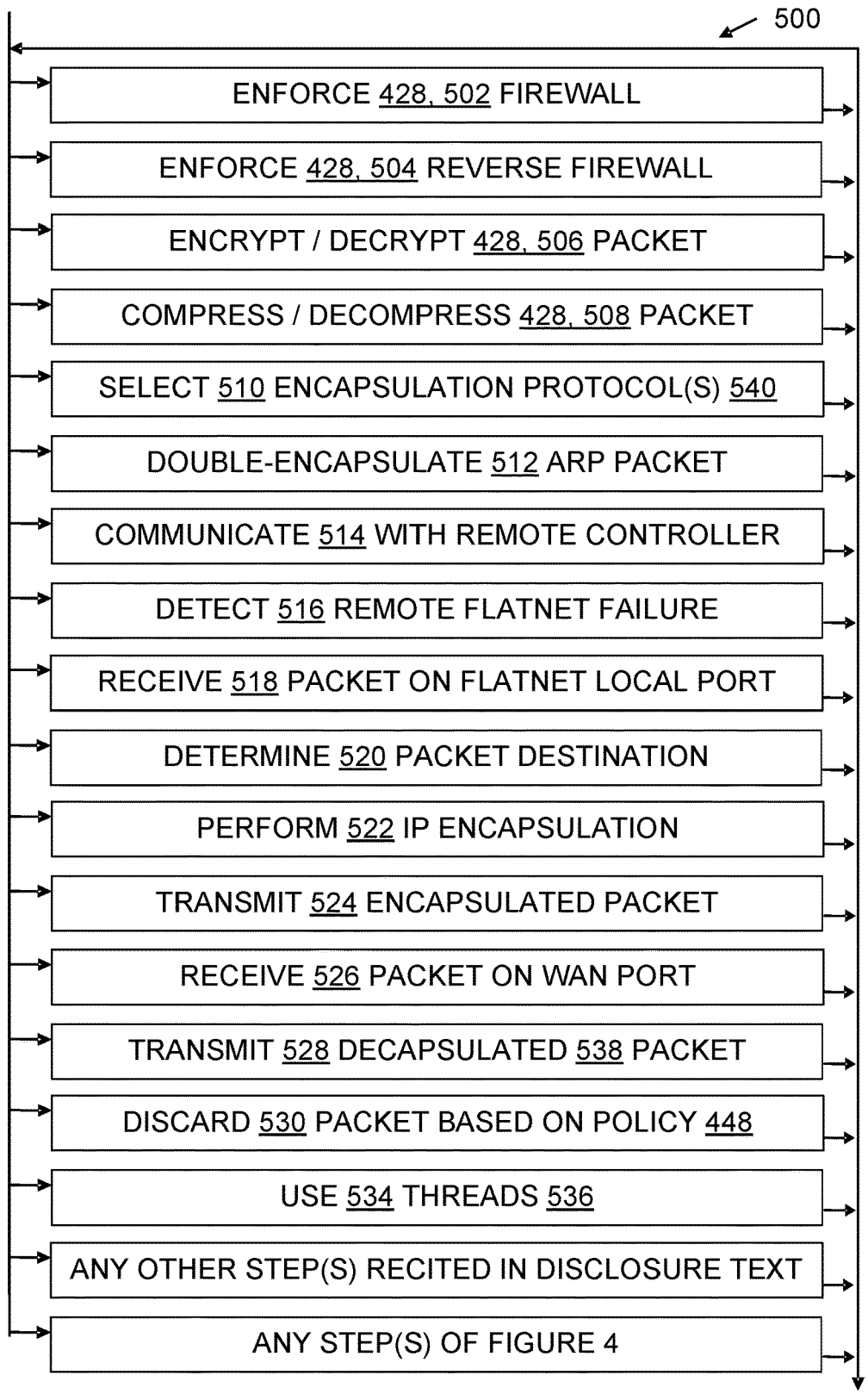

FIGS. 4 and 5 each illustrate aspects of some process embodiments in connected flowcharts 400 and 500. Technical processes shown in the Figures or otherwise disclosed may be performed in some embodiments automatically, e.g., by controller software under control of a script or by automatic hardware or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 4 and 5. Steps may be performed serially, in a partially overlapping manner, or fully in parallel. The order in which flowchart(s) 400 and/or 500 are traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide a flatnet failover process performed with a flatnet failover controller, also referred to below as "the controller". In particular, in some embodiments packets travel from local flatnet portion over a WAN link as follows. The controller detects 516 a flatnet remote portion availability failure, e.g., a connectivity failure or an administrative action taking the network out of service. The controller receives 518 a flatnet packet on a flatnet local port of the controller which is connected to a flatnet local portion. The flatnet packet has a destination address. The controller determines 520 that the flatnet packet is not addressed to travel from a host in the flatnet local portion to another host in the flatnet local portion. Determining step 520 may include using 450 a packet origin table by finding the packet destination address in the packet origin table and ascertaining that the packet destination address is associated in the packet origin table with a different port of the controller than the flatnet local port. The controller performs 522 an IP encapsulation on the flatnet packet, which produces an encapsulated IP packet. Then the controller transmits 524 the encapsulated IP packet toward the flatnet remote portion over a WAN port of the controller.

In some embodiments, packets travel to a local flatnet portion over a WAN link. The controller receives 526 an encapsulated IP packet on a WAN port of the controller, and decapsulates 538 the encapsulated IP packet, which produces a flatnet packet having at least one destination address. The controller determines 520 that the flatnet packet is addressed to a host in a flatnet local portion, e.g., by using 450 the packet origin table to ascertain that the destination address is associated in the packet origin table with a flatnet local port of the controller. The controller obtains 452 a physical address for the host to which the flatnet packet is addressed, and transmits 528 the flatnet packet toward the flatnet local portion over the flatnet local port.

Some embodiments apply load balancing and/or other policies to enhance 428 packet handling 430 by the controller. For example, in some cases the failover process includes at least one of the following steps: load balancing 432 multiple packets between at least two WAN ports of the controller; maintaining 438 a user-specified quality of service 440 for multiple packets which are transmitted through the controller; shaping 442 packet traffic 444 based on a user-specified policy; discarding 530 packets based on a user-specified policy 448; encrypting 506 at least a portion of the flatnet packet before transmitting the encapsulated IP packet toward the flatnet remote portion over the WAN port of the controller; compressing 508 at least a portion of the flatnet packet before transmitting the encapsulated IP packet toward the flatnet remote portion over the WAN port of the controller; enforcing 434 a policy defining packet affinity 436; enforcing 502 a firewall; enforcing 504 a reverse firewall; and/or applying 446 other packet policy 448 to discard or alter packets or otherwise change packet traffic in the controller. Some embodiments include at least two, or at least three, or at least four of these steps (or in the case of systems, their corresponding modules from FIG. 3).

Some embodiments permit administrators to select 510 an IP encapsulation protocol 540, and in some the selection is made automatically or only one encapsulation protocol is used. For example, some embodiments perform 522 an IP encapsulation on the flatnet packet by encapsulating the flatnet packet using a Generic Routing Encapsulation header, and some use an IP in IP protocol 540 for IP encapsulation.

Some embodiments use 534 multithreading. For example, some processes perform different functions on different threads 536 within the controller, such as processing packets received on a given port, processing packets sent over a given port, encrypting packet payloads, decrypting packet payloads, compressing packet payloads, and decompressing packet payloads.

In some embodiments, the controller monitors 402 the flatnet periodically or at defined times while connected 424 to the local and remote flatnet portions 426. When the controller detects 516 a flatnet remote portion availability failure, and subsequently receives 526 an encapsulated IP packet on a WAN port, the controller decapsulates 538 the encapsulated IP packet to produce a flatnet packet, determines 520 that the flatnet packet is addressed to a host in a flatnet local portion, gets 452 a physical address for that host, and transmits 414 the flatnet packet toward the flatnet local portion over the flatnet local port. The physical address is either read 416 from the packet origin table, or ARP is used 418 to get the physical address. If the obtained 452 physical address was not already in the packet origin table, that table is updated 404 to include it. Packets traveling from one local flatnet portion host to another host in the local flatnet are ignored 406, meaning they are not passed to another port of the controller.

In some embodiments, when the flatnet is down and the controller receives a flatnet packet on a flatnet local port and determines that the flatnet packet is not local-to-local traffic, the packet is submitted 410 for IP encapsulation to produce an encapsulated IP packet by using at least one of the following protocols: Generic Routing Encapsulation, IP in IP. Then the controller transmits 412 the encapsulated IP packet toward the flatnet remote portion over a WAN port.

By contrast, when the flatnet is up flatnet traffic is passed through 408 between the flatnet ports rather than being sent over a WAN port.

In some embodiments, obtaining 452 a physical address for the host to which the flatnet packet is addressed includes ascertaining that the packet origin table does not contain a physical address for a host identified in the flatnet packet by an IP address, and then using Address Resolution Protocol to obtain the physical address. In particular, some embodiments use a form of double-encapsulation 512 ARP tunneling, which involves encapsulating an Address Resolution Protocol packet in a first encapsulation thereby producing an encapsulated ARP packet, and then encapsulating the encapsulated ARP packet with an IP header. Some embodiments permit administrators to select 510 an ARP packet encapsulation protocol 540, and in some the selection is made automatically or only one encapsulation protocol is used prior to the IP encapsulation. In some embodiments the first encapsulation (i.e., the ARP packet encapsulation) produces an encapsulated ARP packet which is one of the following protocol 540 compliant packets: a UDP packet, a TCP packet. In some an ICMP packet is produced.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured within an embodiment using items such as packet handler 222 code, a packet origin table 216, and double-encapsulation code in a packet encapsulater 322, in the form of data 118 and instructions 116, read from a removable medium 114 and/or another source such as a network connection, to form a configured medium. The configured medium 112 is capable of causing a computer system to perform technical process steps for processing flat network packet payloads over one or more WANs as disclosed herein. The Figures thus help illustrate configured storage media and process aspects of embodiments, as well as system or device embodiments. In particular, any of the process steps illustrated in FIG. 4 and/or FIG. 5, or otherwise taught herein, may be used to help configure a storage medium within an embodiment.

Additional Examples

Additional details and design considerations are provided below. As with the other examples herein, the features described may be used individually and/or in combination, or not at all, in a given embodiment.

Those of skill will understand that implementation details may pertain to specific circumstances, such as specific protocol stacks and specific sample addresses, and thus need not appear in every embodiment. Those of skill will also understand that identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from documentation for a brouter failover controller designed and implemented by FatPipe, Inc. Aspects of the brouter failover controller and/or its documentation are consistent with or otherwise illustrate aspects of the embodiments described herein. However, it will be understood that brouter failover controller documentation and/or implementation choices do not necessarily constrain the scope of such embodiments, and likewise that the commercial brouter failover controller product and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Networks and Physical Line Characteristics

Corporate wide area network infrastructure spans the globe and generally encompasses several different types of data connections and topologies. For example, a corporate headquarters or main data center may have a very robust infrastructure with multiple fiber optic data lines or high quality DS3 data lines. Offices in major urban areas may have robust data lines such as metro Ethernet, and/or DS3 and/or DS1 lines. Remote offices at some less advanced infrastructure locations, such as a remote mine or a sparsely populated rural or field location, may have only a satellite link. Also, for reliability reasons the branch office may have only an inferior quality line such as a DSL or cable link. Various lines such as fiber, DS3, metro Ethernet, DS1 and satellite each have different transmission characteristics, which can impact quality and failure.

Network Topologies, Easier Network Configuration

In addition to line variations, a network topology can be specific to entity needs. One example scenario includes a flat network that normally transmits packets over a private line between geographically spaced locations of the flat network, plus an MPLS WAN which also potentially routes between geographically separate portions of a given subnet of the flat network. However, without innovation like that describe herein, a router in the WAN would not know whether a given host is on side of the router or on the other side, when hosts on each side of the router belong to the same subnet. This situation arises at times when broadcast domains are created as network segments by using VLANs, but hosts on the same VLAN could also exist at geographically different locations with intervening routers. One workaround to this lack of routing ability would be to add static routes on every host in the network including the router(s), but this workaround would rapidly become cumbersome as the hosts and routers increase in number and would tend to increase network complexities and maintenance costs.

FatPipe has developed an innovative alternative, in the form of a flat-and-WAN network controller (such as some controllers 200) containing a bridge router, which can route traffic between multiple VLANs as well as on a flat network, without requiring users to enter static routes for each host. A self-learning network controller of this kind can help automate tasks as it reduces or eliminates administrator effort otherwise spent configuring hosts with static routes and/or gateways. Irrespective of VLANs, such an innovative controller can also help flat and not-flat networks co-exist without frequent changes to network path information. Embodiments of some such controllers and their packet handling processes are described herein.

Redundancy, Dealing with Line Failure and Other Incidents

No network line is infallible, no matter the technology it relies on, so measures for line failover are often sought. Some technologies failover sessions (e.g., TCP sessions) or packet flows (e.g., UDP flows, or separate portions of a TCP session) when a line goes down, by pushing the traffic out another line instead of sending it to the failed line. But when a flat network line fails, level 3 routers are not equipped to handle packets the way a flat network bridge or a switch would. Using IEEE 802.1d bridges, for example, one can only forward whatever MAC addresses of hosts are visible to the bridge. If a bridge does not see a MAC address on any of its sides, then it cannot forward the packet to a host having that MAC address.

Some embodiments combine MAC address handling with load balancing, and with failover technology which automatically detects line failover situations and seamlessly fails over. This provides an innovative networking approach that encompasses packet control mechanisms (e.g., forwarding, routing) in two different network protocol stack layers—these layers are exemplified by layer 2 and layer 3 but are also known by other names depending on the networking model (e.g., TCP/IP, OSI) used as a reference. With some embodiments, a flat network can function over one line as usual while an MPSEC® connection or another WAN connection offers redundancy over one or more other public or private lines in case of line failover on the bridge. MPSEC is a mark of FatPipe Networks India, Ltd.

Propagating VLANs Over a Bridge

VLANs are sometimes used to divide a flat network into two or more broadcast domains, e.g., by using IEEE 802.1Q tags. Sometimes VLANs are meant to communicate inter-geographically, e.g., between locations in different buildings, or at even greater distances. One approach to propagating VLAN traffic for better reliability through routing would use trunk ports, but this would require different VLANs on each side of a given network segment. Also, routers would be configured with static routes per host or per subnet per VLAN to implement this approach. Routing flat networks with VLANs thus appears impractical or impossible. But some embodiments described herein provide a transparent router that allows routing traffic in the same LAN segment with same VLAN identifiers across multiple geographic locations. Combining this innovation with load balancing technology, it is possible to failover VLAN traffic in case of line failure.

Figure 7:
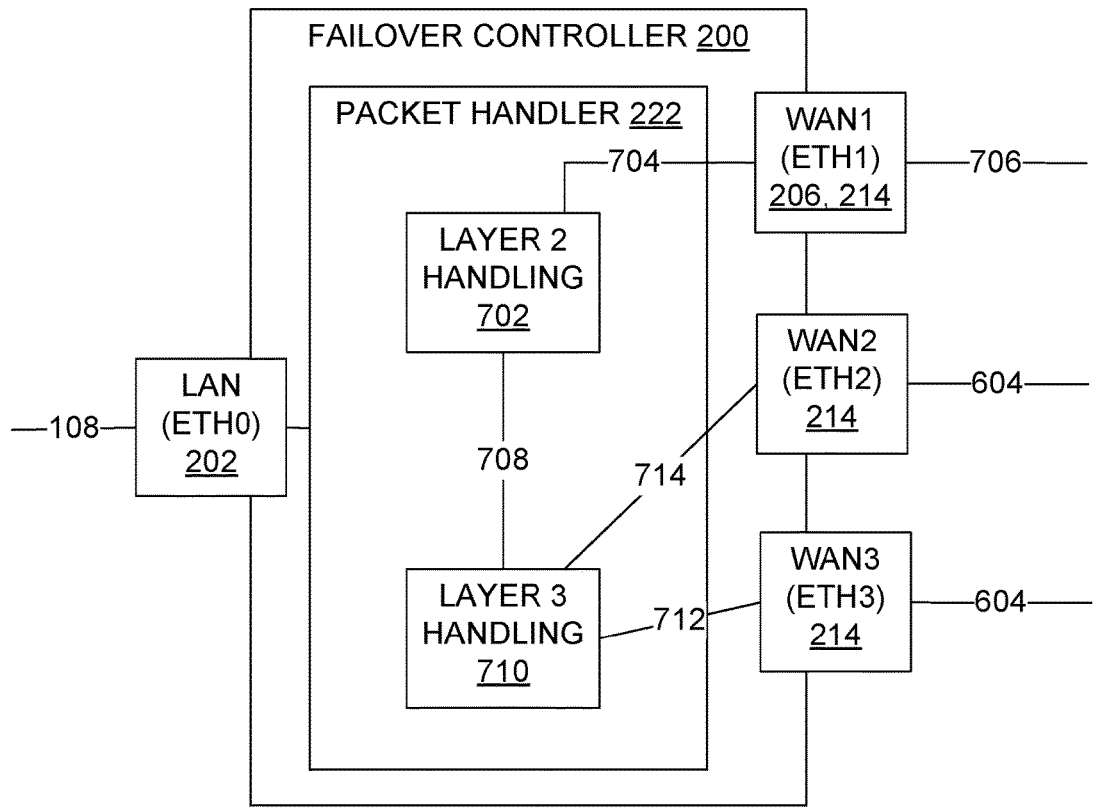
FIG. 7 is a data flow diagram further illustrating a flatnet failover controller according to FIG. 2.

One innovative appliance 200 is illustrated in FIG. 7. In operation, packet traffic from LAN 108 is sent to the packet handler 222, where it is routed or otherwise directed to a flatnet or WAN interface so as to avail failover, better connections and bandwidth aggregation of available lines. In this particular example, WAN1 interface connects to a private MPLS line, WAN2 interface connects to a public DSL line, and WAN3 interface connects to a public 3G/4G line, but other networks may be used in other situations.

When the flat network is up, a packet from LAN 108 is sent to a layer 2 handling module 702 which in this example bridges over an internal hardware and/or software bus or path 704 to an MPLS interface to an MPLS network 706. The MPLS interface operates as a flatnet port 206 when the flatnet is up, but is also labeled as a WAN port in this Figure because MPLS networks can be used as WANs. Flat network packets can be load balanced across the flat network remote port and one or more WAN ports, even when the flat network is up, using some appliances 200. More generally, some or all flat network packets are sent across internal software and/or hardware bus or path 708 to a layer 3 handling module 710 which includes zero or more packet handler enhancements 302-318. Packets from a flat network can thus be distributed over internal software and/or hardware busses or paths 712, 714 to WAN ports 214, based on load balancing, affinity, quality of service, security requirements, and other policies.

In some scenarios, a flat network can be routed subject to best path decision-making to load balance its packets across public lines, e.g., in the event the WAN1 connection fails, thus maintaining flat network connectivity from an end-user's perspective, in a transparent manner so far as end-users are concerned. Instead of (or in some scenarios, in addition to) sending LAN packets over the WAN1 flat network private line, this appliance 200 sends it over multiple public lines via interfaces WAN2 and WAN3. The packet handler 222 takes care of routing decisions in layer 2 and layer3 to improve or optimize the connection flow. Whether it is flat or regular inter-subnet routing, the choice is efficiently made by packet handler 222 software. Also, during failure of a line, traffic flow is not interrupted and the proper line with the best qualities available is used to forward traffic.

In conjunction with details provided below, FIG. 8 illustrates a network architecture which utilizes two controllers 200.

At Host A, host details include 10.64.0.25, mask/24, no gateway.

At point 1, packet details after ARP include ETH (Ethernet) hostAmac to hostBmac, IP 10.64.0.25->10.64.0.5 (LAN, nonroutable), TCP SRC (Source) port 33456 to DST (Destination) port 80.

At point 2, VLAN details include Trunk port VLAN 64, and packet details are ETH hostAmac to hostBmac, VLAN tag 64, IP 10.64.0.25->10.64.0.5, TCP SRC 33456 to DST 80.

WAN1 and LAN are bridged IP 10.64.0.1/24 across Controller1 between point 2 and point 3.

At point 3, VLAN details include Trunk port VLAN 85.

Flat Network 602 does layer 2 traffic direction.

At point 4, packet details include ETH hostAmac to hostBmac, VLAN tag 85, IP 10.64.0.25->10.64.0.5, TCP SRC 33456 to DST 80, and VLAN details are Trunk port VLAN 85. In this case, "hostAmac" means Host A's MAC address, and "hostBmac" means Host B's MAC address.

WAN1 and LAN are bridged IP 10.64.0.2/24 across Controller2 between point 4 and point 7.

At point 7, packet details include ETH hostAmac to hostBmac, VLAN tag 65, IP 10.64.0.25->10.64.0.5, TCP SRC 33456 to DST 80, and VLAN details are Trunk port VLAN 65.

At point 8, packet details include ETH hostAmac to hostBmac, IP 10.64.0.25->10.64.0.5, TCP SRC 33456 to DST 80.

At Host B, host details include 10.64.0.5, mask/24, no gateway.

At point 5, WAN2 details include IP 172.18.2.1/24.

Within WAN 604, which is this example is an MPLS cloud with a router R on each edge, packet details include ETH FPleftMAC to MPLS routermac, IP 172.18.2.1->172.16.2.1, GREv0 header, IP 10.64.0.24->10.64.0.5, TCP SRC 33456 to DST 80. In this case, "FPleftMAC" is a Controller1 MAC address, "MPLS routermac" is an MPLS router MAC address, 172.18.2.1 and 172.16.2.1 are Controller1 and Controller2 IP addresses, and "GREv0 header" is a GRE header encapsulating the subsequent packet which is designated by "IP 10.64.0.24->10.64.0.5, TCP SRC 33456 to DST 80".

At point 6, WAN2 details include IP 172.16.2.1/24 on MPLS.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 4 and 5 also help describe configured media, and help describe the technical effects and operation of systems, individual devices, and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

Each patent incorporated by reference herein is incorporated in its entirety to the extent permitted under applicable law of the jurisdiction in question, and with the understanding that statements made expressly herein take precedence over apparently contradictory incorporated statements, and incorporated statements take precedence over silence of the present disclosure's expressly stated description.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A flatnet failover controller, comprising:
   a flatnet local port connectable to a local portion of a flatnet to transmit packets between the local portion of the flatnet and the flatnet failover controller;
   a flatnet remote port connectable to a remote portion of the same flatnet to transmit packets between the remote portion of the flatnet and the flatnet failover controller;
   at least one WAN port;
   a packet origin table residing in a computer-readable memory in the flatnet failover controller;
   a packet handler operable with at least one digital processor of the flatnet failover controller as follows on at least one packet received on at least one of the ports:
      (a) when a flatnet connection is up and the packet was received on one of the flatnet ports, then (i) update the packet origin table with an identifier of a source host of the packet and an identifier of whichever port the packet was received on, (ii) ignore the packet when the packet is traveling from a host in the local portion of the flatnet to another host in the local portion of the flatnet, and (iii) otherwise pass the packet through toward the other flatnet port,
      (b) when the flatnet connection is down and the packet was received on the flatnet local port, then (i) ignore the packet when the packet is traveling from a host in the local portion of the flatnet to another host in the local portion of the flatnet, and (ii) otherwise submit the packet for IP encapsulation and transmission over a WAN port,
      (c) when the flatnet connection is down and the packet was received on a WAN port, then (i) when the packet origin table contains a physical address for a host identified in the packet by an IP address, place that physical address in the packet and send the packet toward the flatnet local port, and (ii) when the packet origin table does not contain a physical address for a host identified in the packet by an IP address then use Address Resolution Protocol to obtain said physical address, and then place that physical address in the packet and send the packet toward the flatnet local port.

2. The flatnet failover controller of claim 1, wherein the flatnet local port is connected to the local portion of the flatnet, the flatnet remote port is connected to the remote portion of the same flatnet, and the local portion of the flatnet is geographically separated from the remote portion of the same flatnet in that the two portions do not reside in the same building.

3. The flatnet failover controller of claim 1, wherein the flatnet local port is connected to the local portion of the flatnet, the flatnet remote port is connected to the remote portion of the same flatnet, and the local portion of the flatnet is geographically separated from the remote portion of the same flatnet in that the two portions do not reside in the same postal code area.

4. The flatnet failover controller of claim 1, wherein the flatnet local port is connected to the local portion of the flatnet, the flatnet remote port is connected to the remote portion of the same flatnet, the local portion of the flatnet is geographically separated from the remote portion of the same flatnet, and any nontrivial division of flatnet host IP addresses by subnet results in at least one subnet which contains geographically separated hosts of the flatnet.

5. The flatnet failover controller of claim 1, comprising at least two WAN ports, and wherein the packet handler further comprises a load balancer which is operable to balance packet traffic between the at least two WAN ports at least when the flatnet connection is down.

6. The flatnet failover controller of claim 1, wherein the packet handler further comprises at least one of the following: a load balancer, an affinity enforcer, a quality of service maintainer, a packet traffic shaper, a packet policy applier, a firewall, or a reverse firewall.

7. The flatnet failover controller of claim 1, wherein the packet handler further comprises an encrypter which is operable to encrypt packets submitted for transmission over a WAN port of the controller differently than packets which are submitted for transmission over a flatnet port of the controller.

8. The flatnet failover controller of claim 1, wherein the packet handler is further operable to update the packet origin table with an identifier of a source host of the packet and an identifier of whichever port the packet was received on when the flatnet connection is down.

9. The flatnet failover controller of claim 1, wherein the packet handler is operable to encapsulate an Address Resolution Protocol packet in a first encapsulation thereby producing an encapsulated ARP packet, and to then submit the encapsulated ARP packet for IP encapsulation and transmission over a WAN port.

10. The flatnet failover controller of claim 9, wherein the packet handler is operable to encapsulate an Address Resolution Protocol packet in a first encapsulation thereby producing an encapsulated ARP packet which is one of the following: a UDP packet, a TCP packet, an ICMP packet.

11. The flatnet failover controller of claim 1, wherein the packet handler is operable to perform IP encapsulation by encapsulating a packet using at least one of the following protocols: Generic Routing Encapsulation, IP in IP.

12. The flatnet failover controller of claim 1, wherein the controller comprises multiple processing threads, and the packet handler is operable to perform different functions on different threads, and the functions comprise at least two of the following: processing packets received on a given port, processing packets sent over a given port, encrypting packet payloads, decrypting packet payloads, compressing packet payloads, decompressing packet payloads.

13. The flatnet failover controller of claim 1, in combination with a second such flatnet failover controller, wherein the second such flatnet failover controller flatnet local port is connected to the remote portion of the flatnet, and the two flatnet remote ports are connected to one another via the flatnet.

14. The flatnet failover controller of claim 1, in combination with a second such flatnet failover controller, wherein the second such flatnet failover controller flatnet local port is connected to the remote portion of the flatnet, the two flatnet remote ports are connected to one another via the flatnet, and the flatnet failover controllers are geographically separated from each other in that they do not reside in the same postal code area.

15. A flatnet failover process performed with a flatnet failover controller, also referred to here as "the controller", the process comprising the steps of:
   when the controller is not detecting an availability failure of a remote portion of a flatnet and the controller receives a packet on a flatnet port of the controller, then the controller not passing the packet through toward another flatnet port of the controller when the packet is traveling from a host in a local portion of the flatnet to another host in the local portion of the flatnet, and otherwise the controller passing the packet through toward another flatnet port of the controller;
   when the controller is not detecting a flatnet remote portion availability failure and the controller receives a packet on a WAN port of the controller, then when the controller has a physical address for a host identified in the packet by an IP address, the controller placing that physical address in the packet and sending the packet toward a flatnet local port, and when the controller does not have a physical address for a host identified in the packet by an IP address then using Address Resolution Protocol or Neighbor Discovery Protocol or both to obtain said physical address, and then placing that physical address in the packet and sending the packet toward the flatnet local port; and
   when the controller is detecting a flatnet remote portion availability failure and the controller receives a flatnet packet on a flatnet local port of the controller which is connected to the flatnet local portion, the flatnet packet having a destination address, and the flatnet packet is not addressed to travel from a host in the flatnet local portion to another host in the flatnet local portion, then the controller performing an IP encapsulation on the flatnet packet, which produces an encapsulated IP packet, and the controller transmitting the encapsulated IP packet toward the flatnet remote portion over a WAN port of the controller.

16. The flatnet failover process of claim 15, further comprising the controller load balancing multiple packets between at least two WAN ports of the controller.

17. The flatnet failover process of claim 15, further comprising at least one of the following steps:
   the controller shaping packet traffic based on a user-specified policy;
   the controller discarding packets based on a user-specified policy;
   the controller maintaining a user-specified quality of service for multiple packets which are transmitted through the controller.

18. The flatnet failover process of claim 15, further comprising at least one of the following steps:
   the controller encrypting at least a portion of the flatnet packet before transmitting the encapsulated IP packet toward the flatnet remote portion over the WAN port of the controller; or
   the controller compressing at least a portion of the flatnet packet before transmitting the encapsulated IP packet toward the flatnet remote portion over the WAN port of the controller;
   encapsulating an Address Resolution Protocol packet in a first encapsulation thereby producing an encapsulated ARP packet, and then encapsulating the encapsulated ARP packet with an IP header.

19. The flatnet failover process of claim 15, wherein performing an IP encapsulation on the flatnet packet comprises encapsulating the flatnet packet using a Generic Routing Encapsulation header.

20. The flatnet failover process of claim 15, further comprising performing different functions on different threads within the controller, and wherein the functions comprise at least two of the following: processing packets received on a given port, processing packets sent over a given port, encrypting packet payloads, decrypting packet payloads, compressing packet payloads, decompressing packet payloads.

* * * * *